343-909. OR 3569980 SR

[11] 3,569,980

[72] Inventor Jacques Salmon
Paris, France
[21] Appl. No. 728,279
[22] Filed May 9, 1968
[45] Patented Mar. 9, 1971
[73] Assignee Thomson C.S.F.
Paris, France
[32] Priority May 16, 1967
[33] France
[31] 106,515

[54] POLARIZER NETWORK
3 Claims, 6 Drawing Figs.

[52] U.S. Cl. 343/909, 333/21
[51] Int. Cl. H01q 15/02, H01p 1/16
[50] Field of Search 343/756, 909; 333/21, 21 (A)

[56] References Cited
UNITED STATES PATENTS
3,271,771 9/1966 Hannan et al. 343/756

*Primary Examiner*—Eli Lieberman
*Attorney*—Cushman, Darby and Cushman

ABSTRACT: The operating bandwidth of a polarizer transmitting network is increased through associating at least two pairs of elementary polarizer transmitting networks, the phase shifts between the components of the wave due to an elementary network being such that their sum is equal to the desired phase shift.

POLARIZER NETWORK

The present invention relates to networks of parallel conductors which modify the polarization of a wave propagating therethrough.

More particularly it is an object of the invention to provide a network system upon propagation through which a linearly polarized wave becomes circularly polarized or more generally, elliptically polarized.

Generally speaking, polarizer networks of parallel wires can be broken down into two groups according to whether the spacing between the wires is "small", say lower than one-tenth of the wavelength of the operating wave, or "large" i.e. greater than this value.

In the former case the wave component which is parallel to the wires of the networks is reflected, while the component normal to the wires propagates through the network, If such a network is used for the reflection purposes, a metal reflector plane has to be placed behind the network at a distance $\lambda/4$ therefrom, $\lambda$ being the operating wavelength. The operating frequency band of such network is rather narrow.

Networks with broadly spaced wires pass at least a portion of the incoming wave component which is polarized parallel to the wires. The operating frequency band depends on the spacing between the wires.

According to the invention there is provided a polarizer transmitting network system for transforming an incident linearly polarized electromagnetic wave into a wave having two components normal to each other having a predetermined phase shift $\Phi$ with respect to each other, said polarizer comprising $n$ pairs of polarizer transmitting networks, where $n$ is an integer greater than 1, each network comprising wires inclined at $\pi/4$ to the polarization direction of the incident wave the wires of all the networks being parallel to each other and, each pair of networks transforming a linearly polarized incident wave into a wave having two components normal to each other having a relative phase shift $\Phi_i$ with $i=1,2,...n$, where $\Phi_i$ is smaller than $\Phi$ and $\Sigma_1^n\varphi_i=\Phi$.

For a better understanding of the invention and to show how the same may be carried into effect, reference will be made to the drawing accompanying the following description and in which.

Figure 1:
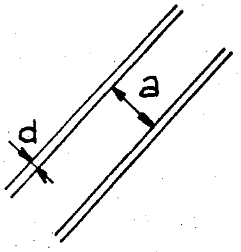
FIGS. 1 to 4 are explanatory diagrams.

As already mentioned, the transmission ratio of a network depends on the spacing a between the wires building up the network partly shown in FIG. 1.

When the spacing is small, say lower, than $\lambda/10$, the transmission ratio tends to zero; when the spacing is large, say greater than $\lambda/4$, the transmission ratio tends to one. In-between, a part of the wave energy is passed and a part reflected. Designating by $t$ and $\rho$, the transmission ratio and the reflection ratio respectively, and by E, $E_o'$ and $E_o''$ the field intensities of the incoming, transmitted and reflected waves respectively, one may write $$t=\frac{E_0'}{E} \text{ and } \rho=\frac{E_0''}{E}$$

with $t^2+\rho^2=1$, disregarding the losses.

The reflection ratio and the transmission ratios may be represented as vectors $\rho$, and $t$ the sum of which represents the incident wave energy. The above relation shows that vectors $t$ and $\rho$ are perpendicular to each other.

Of course all this is true only for the incident waves whose electric field is parallel to the wires, the spacing of which is sufficiently large for the vertical component to be entirely transmitted.

Figure 3:
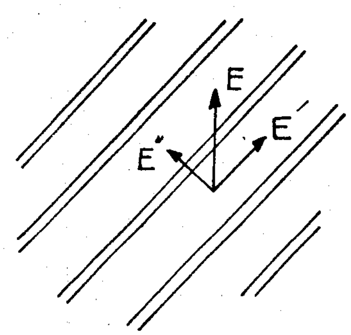
Figure 4:
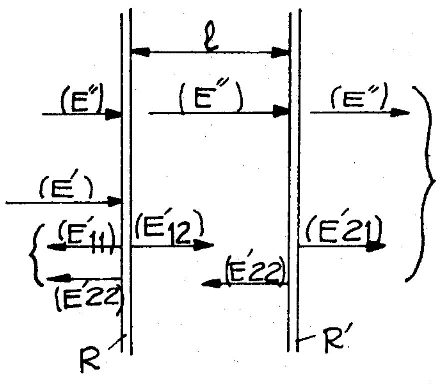

A polarizer transmitting network system is built up by two networks of wires inclined at 45° to the polarization direction of the incident wave. This polarization is assumed to be vertical in FIGS. 3 and 4, where E is the electric field vector of the incident wave and E' and E'' the field vectors respectively parallel and normal to the wires. FIG. 3 is a front view of a first network and FIG. 4 is a lateral view of both networks of a pair.

The component E'' propagates through both networks provided the ratio a/d is higher than 10, d being the diameter of the wires shown in FIG. 1.

The component E' gives rise to a component $E'_{11}$ which is reflected by the network R and a component $E'^{12}$ which is passed thereby. The component $E'_{12}$ is partly passed by the network R' E' as a component $E'_{21}$ and partly reflected thereby as a component $E'_{22}$.

Accordingly the wave transmitted by the network assembly results from the components E'' and $E'_{21}$, while the reflected wave results from the components $E'_{11}$ and $E'_{22}$.

The polarizer is matched when the reflected wave is cancelled i.e. when the component $E'_{22}$ upon reaching the network R has the same amplitude as the wave $E'_{11}$ and an opposite phase.

If a circular polarization is to be obtained the components of the transmitted wave have to have the same amplitude while they are phase shifted by $\frac{\pi}{2}$ with respect to each other.

Calling $$\varphi=\frac{2\pi\cdot\rho}{\lambda}$$

the phase shift which the component E'' undergoes while propagating along the distance $\Phi$ from network R to network R', one may write $$\frac{E''_2}{E''}=\theta^{-j\varphi}$$

$E''_2$ being the wave E'' upon leaving the network $$\frac{E'_{21}}{E'}=\frac{t^2e^{-j\varphi}}{1-\theta^{-2j\varphi}\rho^2}=T$$

It may be shown that the matching condition may be written:

$$Re=\rho\left(1+\frac{\theta^{-2j\varphi}t^2}{1-\theta^{-2j\varphi}\rho^2}\right)=0$$

T and Re being, by definition respectively the transmission and reflection coefficients of the polarizer network.

Figure 2:
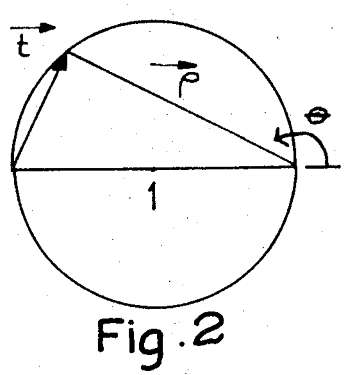

One of the solutions of this equation is $\Phi=\Theta$, $\Theta$ being shown in FIG. 2. The condition for obtaining the circular polarization becomes $$\theta=\varphi=\frac{3\pi}{4}$$

Figure 5:
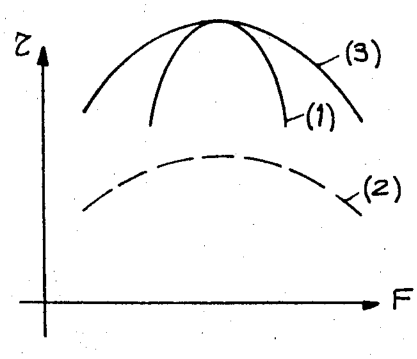
FIG. 5 shows the operation of a network according to the invention.

For a given network the transmission characteristic $\tau$ as a function of the frequency F is then in the form of the curve 1 of FIG. 5.

Figure 6:
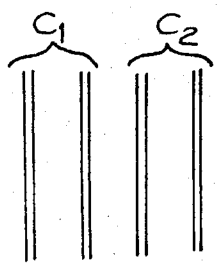
FIG. 6 shows a network according to the invention.

According to the invention instead of using the system of FIG. 4 having the above defined characteristics, two identical assemblies $C_1$ and $C_2$ as shown in FIG. 6 are used, each assembly comprising one system as shown in FIG. 4. For obtaining a circularly polarized wave the characteristics of these networks are such that a phase shift of $$\frac{\pi}{4}$$

occurs between the two wave components, upon propagating through each of the networks so that upon leaving the network $C_2$ the phase shift is $$\frac{\pi}{2}$$

The curve 3 representing the overall transmission ratio versus the frequency is more flat the curve 1 i.e. the passe-band has been increased. This is due to the fact that the curve 3 is the resultant of two curves 2 which are more flat than curve 1, due to the fact that the phase shift is less.

The passe-band may be still increased by associating more than two pairs of networks, say $n$ pairs of networks, the phase shift due to the propagation through each pair of networks being equal to $$\frac{\pi}{2n}$$

if the networks are all identical. More generally, for obtaining circularly polarized waves, the networks are to be so selected that the sum of the phase shifts between the two wave components is equal to $$\frac{\pi}{2}$$

Of course the invention is not limited to the embodiments described and shown which were given solely by way of example.

I claim:

1. A polarizer transmitting network system for transforming an incident linearly polarized electromagnetic wave into a wave having two components normal to each other having a predetermined phase shift $\Phi$ with respect to each other, said polarizer comprising $n$ pairs of polarizer transmitting networks, where $n$ is an integer greater than 1, each network comprising wires inclined at $\pi/4$ to the polarization direction of the incident wave, the wires of all the networks being parallel to each other and, each pair of networks transforming a linearly polarized incident wave into a wave having two components normal to each other having a relative phase shift $\Phi_i$ with $i=1,2,\ldots n$, where $\Phi_i$ is smaller than $\Phi$ and $\Sigma_1^n \Phi_i=\Phi$.

2. A polarizer transmitting network system according to claim 1, wherein said pairs are identical and $$\varphi_i=\frac{\Phi}{n}$$

3. A polarizer transmitting network system according to claim 2, wherein said incident wave being transformed in a circularly polarized wave, $\varphi_i=\frac{\pi}{2n}$